United States Patent
Tamai et al.

(10) Patent No.: US 8,619,271 B2
(45) Date of Patent: Dec. 31, 2013

(54) IMAGE PROCESSING APPARATUS, MAINTENANCE SYSTEM, AND JOB CONTROL METHOD

(75) Inventors: Yoshiyuki Tamai, Itami (JP); Hisashi Uchida, Kuze-gun (JP); Kazusei Takahashi, Nishinomiya (JP); Masaya Hashimoto, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1161 days.

(21) Appl. No.: 12/548,870

(22) Filed: Aug. 27, 2009

(65) Prior Publication Data

US 2010/0053658 A1 Mar. 4, 2010

(30) Foreign Application Priority Data

Sep. 3, 2008 (JP) ................................. 2008-226125

(51) Int. Cl.
*G06F 3/12* (2006.01)
(52) U.S. Cl.
USPC .......................................... 358/1.13; 347/19
(58) Field of Classification Search
None
See application file for complete search history.

(56) References Cited

U.S. PATENT DOCUMENTS

| | | |
|---|---|---|
| 2003/0025927 A1 | 2/2003 | Hino et al. |
| 2003/0035139 A1 | 2/2003 | Tomita et al. |
| 2007/0080776 A1 | 4/2007 | Suwabe et al. |
| 2008/0183748 A1 | 7/2008 | Kamat |

FOREIGN PATENT DOCUMENTS

| | | |
|---|---|---|
| JP | 63-201756 | 8/1988 |
| JP | 04-076134 | 12/1992 |
| JP | 2003-044308 A | 2/2003 |
| JP | 2003-058338 A | 2/2003 |
| JP | 2007-108957 | 4/2007 |
| JP | 2008-197811 | 8/2008 |
| JP | 2009-009545 | 1/2009 |

OTHER PUBLICATIONS

Office Action (Notification of Reasons for Refusal) dated Aug. 17, 2010, issued in the corresponding Japanese Patent Application No. 2008-226125, and an English Translation thereof.

*Primary Examiner* — Twyler Haskins
*Assistant Examiner* — Lennin RodriguezGonzalez
(74) *Attorney, Agent, or Firm* — Buchanan Ingersoll & Rooney PC

(57) ABSTRACT

To reduce downtime due to maintenance of an image processing apparatus as much as possible.
Image processing jobs and maintenance jobs of the image processing apparatus are treated in the same way and registered together in the same table. With reference to a table having recorded therein prohibited functions that need to be prohibited during execution of the maintenance job, control is performed such that an image processing job that does not use the prohibited functions (Step S15: NO) is executed in parallel with the maintenance job even during execution (Step S16).

18 Claims, 13 Drawing Sheets

FIG. 5

Reserved job table

| Job number | Job type | Start time | Reboot necessary ? | Maintenance server |
|---|---|---|---|---|
| 1 | 1 (Print job) | 2008/7/2, 08:30 | | |
| 2 | 6 (Address book backup) | 2008/7/2, 12:00 | No | 192.168.0.2 |
| 3 | 2 (Scan job) | 2008/7/2, 12:45 | | |
| 4 | 5 (Network setup) | 2008/7/3, 06:00 | Yes | |
| ... | | | | |

FIG. 6

Execution job table

| Job number | Job type | Reboot necessary ? | Maintenance server |
|---|---|---|---|
| 1 | 1 (Print job) | | |
| 2 | 6 (Address book backup) | No | 192.168.0.2 |
| 3 | 2 (Scan job) | | |
| 4 | 1 (Print job) | | |
| ... | | | |

FIG. 7

Maintenance job registration

Select maintenance type.
Address book backup ▼

Set maintenance start time.
March ▼  18 ▼  23 : 30    Execute immediately ☐

Select maintenance server.
Maintenance server 01 ▼

Register    Cancel

FIG. 8

```
Maintenance job registration                          _ ☐ X

Select maintenance type.
    ┌─────────────────────────────┐
    │ Address book backup       ▼ │
    └─────────────────────────────┘

Set maintenance start time.
    ┌──────────┐ ┌─────┐ ┌───┐ ┌────┐  Execute      ☐
    │ October ▼│ │ 24 ▼│ │ 6 │:│ 00 │  immediately
    └──────────┘ └─────┘ └───┘ └────┘

Select MFP to be maintained.
    ┌─────────────────────────────┐
    │ MFP01                     ▼ │
    └─────────────────────────────┘

Select maintenance server.
    ┌─────────────────────────────┐
    │ Maintenance server 01     ▼ │
    └─────────────────────────────┘

[ Register ]  [ Cancel ]
```

FIG. 10

Table of functions prohibited during execution of maintenance jobs

| Maintenance job | Prohibited function |
|---|---|
| 5. Network setup | All functions except copy |
| 6. Address book backup | Registration in address book, reference to address book, and destination selection from address book |
| 7. BOX backup | Save document in BOX, transmission from BOX, and reference to BOX |
| 8. Maintenance of mechanical parts of printer engine | Copy and print |
| 9. Maintenance of mechanical parts of scanner | Job that needs document scan (scan transmission, FAX transmission, and copy) |

IMAGE PROCESSING APPARATUS, MAINTENANCE SYSTEM, AND JOB CONTROL METHOD

This application is based on application No. 2008-226125 filed in Japan, the content of which is hereby incorporated by reference.

BACKGROUND OF THE INVENTION (1) Field of the Invention

The present invention relates to an image processing apparatus and a method of controlling a job executed by the image processing apparatus, and particularly to an art of controlling execution of a maintenance job of maintaining the image processing apparatus.

(2) Related Art

There are various types of maintenance processing of maintaining an image processing apparatus that performs image processing such as print, scan, copy, and FAX transmission. For example, maintenance processing of maintaining mechanical parts includes cleaning of a transfer roller. Maintenance processing of maintaining software includes setup of a network, backup of an address book, and backup of data stored in the image processing apparatus.

These maintenance processing is performed in the image processing apparatus under a condition such as reception of a user's maintenance instruction, an elapse of a predetermined period of time, and the accumulated number of sheets for image formation completed.

[Patent Document 1] Japanese Patent Application Publication No. 2003-58338

Conventionally, it is impossible to execute an image processing job such as a print job, a copy job, and a scan job while the image processing apparatus executes maintenance processing as described above. Also, such maintenance processing is managed and executed separately from the image processing job. As a result, the image processing job might unnecessarily need to wait to be executed for a long period. This causes great inconvenience.

SUMMARY OF THE INVENTION

The present invention is made in view of the above problems, and aims to provide an image processing apparatus, a maintenance system, and a job control method that are capable of smoothly executing maintenance processing and an image processing job so as to reduce a waiting time of the image processing job as much as possible.

The above aim is achieved by (i) an image processing apparatus capable of executing at least one of a plurality of image processing jobs including a copy job, a FAX job, a print job, and a scan job, the image processing apparatus comprising: a first receiver operable to receive one or more of the plurality of image processing jobs; a second receiver operable to receive one or more maintenance jobs necessary for maintaining the image processing apparatus; a job register operable to register therein the received image processing jobs and the received maintenance jobs; and a controller operable to control execution of the registered image processing jobs and the registered maintenance jobs, with reference to the job register, wherein if a maintenance job and an image processing job that are executable in parallel with each other are registered in the job register, the controller executes the maintenance job and the image processing job in parallel with each other, (ii) a maintenance system for maintaining image processing apparatuses, the maintenance system including the image processing apparatuses and maintenance servers for executing maintenance jobs, the image processing apparatuses and the maintenance servers being connected with one another via a network, wherein each of the image processing apparatuses comprises: a first receiver operable to receive one or more image processing jobs; a second receiver operable to receive one or more maintenance jobs necessary for maintaining the image processing apparatus in association with designation of maintenance servers for respectively executing the maintenance jobs; a job register operable to register therein the received image processing jobs and the received maintenance jobs associated with the maintenance servers; a controller operable to control execution of the registered image processing jobs and the registered maintenance jobs, with reference to the job register, wherein if a maintenance job and an image processing job that are executable in parallel with each other are registered in the job register, the controller executes the maintenance job and the image processing job in parallel with each other; and an execution request transmitter operable to transmit an execution request for executing each of the maintenance jobs to one of the maintenance servers registered in association with the maintenance job, and each of the maintenance servers comprises: an execution request receiver operable to receive the execution request from the image processing apparatus; and a maintenance job executer operable, when the execution request is received, to boot an application for executing the maintenance job and execute the maintenance job, and (iii) a job control method executed in an image processing apparatus capable of executing at least one of a plurality of image processing jobs including a copy job, a FAX job, a print job, and a scan job, the job control method comprising: a first reception step of receiving one or more of the plurality of image processing jobs; a second reception step of receiving one or more maintenance jobs necessary for maintaining the image processing apparatus; a job registration step of registering the received image processing jobs and the received maintenance jobs; and a control step of controlling execution of the registered image processing jobs and the registered maintenance jobs, with reference to the registration in the job registration step, wherein if a maintenance job and an image processing job that are executable in parallel with each other are registered in the job register, the control step executes the maintenance job and the image processing job in parallel with each other.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 5 shows an example of a reserved job table;

FIG. 6 shows an example of an execution job table;

FIG. 7 shows an example of a maintenance job registration screen displayed on an operation panel of the image processing apparatus;

FIG. 8 shows an example of a maintenance job registration screen of a client apparatus;

FIG. 10 shows an example of prohibited functions corresponding to maintenance jobs;

DESCRIPTION OF PREFERRED EMBODIMENT

The following describes a preferred embodiment of an image processing apparatus relating to the present invention with reference to the drawings.

(1. Overall Structure)

Figure 1:
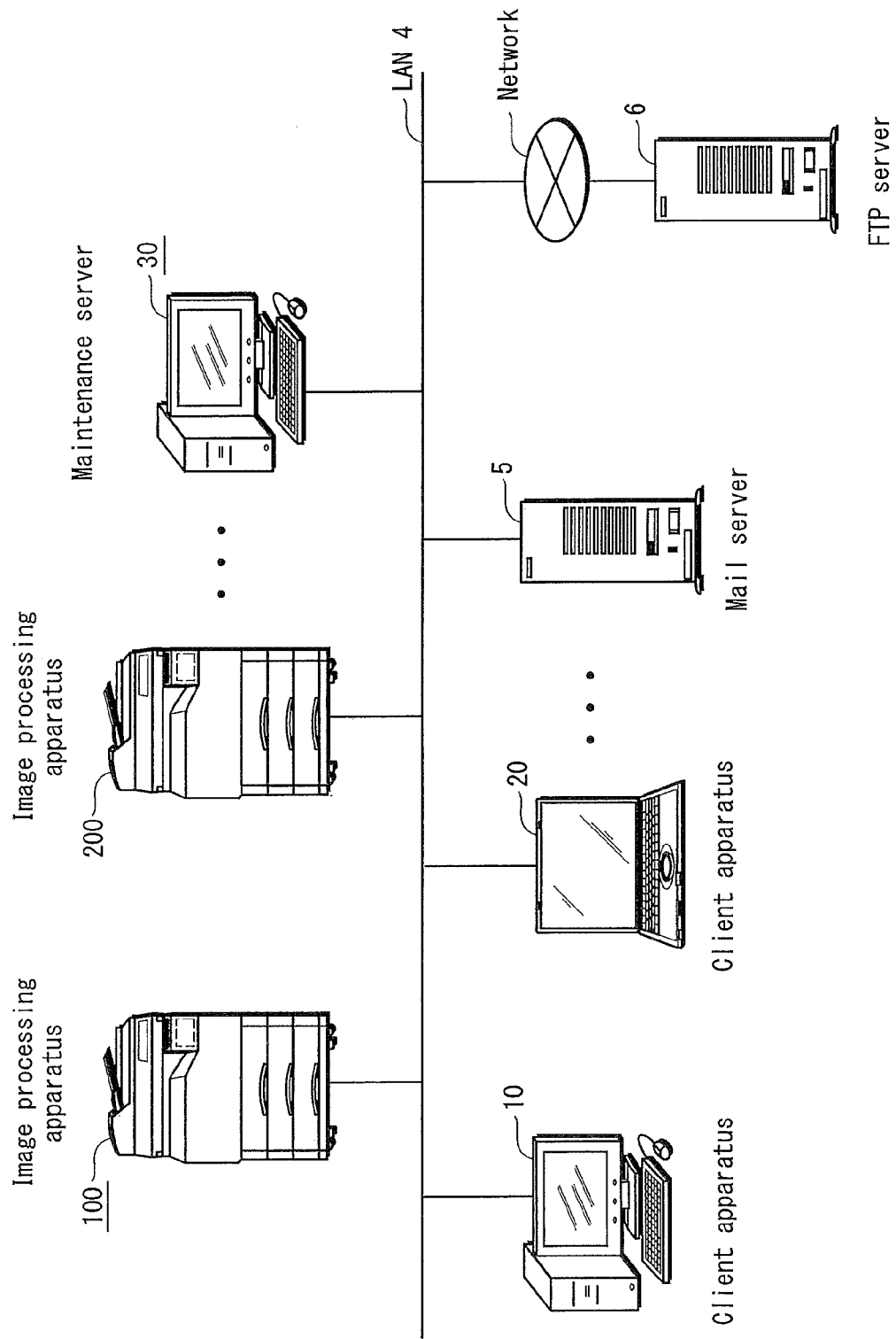
FIG. 1 shows the schematic structure of an image processing system relating to an embodiment of the present invention.

FIG. 1 shows the schematic structure of an image processing system including an image processing apparatus relating to an embodiment of the present invention (hereinafter referred to as simply "system").

As shown in FIG. 1, this system includes image processing apparatuses 100, 200, ... , and client apparatuses 10, 20, ... , which are provided in a user's office for example, a maintenance server 30, a mail server 5, and the like, which are connected with each other via a LAN (Local Area Network) 4. Furthermore, an FTP (File Transfer Protocol) server 6 or the like is connected with the LAN 4 via a network such as the Internet.

The image processing apparatuses 100, 200, ... are each an MFP (Multi Function Peripheral) having a printer function, a copy function, a FAX function, and a scan function.

The client apparatuses 10, 20, ... are each a personal computer, and issue an instruction to the image processing apparatuses 100, 200, ... to perform processing of printing on a sheet a document and an image created by installed application software (hereinafter referred to as "print job").

Also, the LAN 4 is connected with the mail server 5, and collects and distributes e-mail. When the image processing apparatus executes a job of transmitting a scanned image attached to e-mail (hereinafter referred to as "scan transmission job"), the mail server 5 receives the e-mail, and stores the received e-mail in a mailbox of a corresponding transmission destination.

(2. Structure of Image Processing Apparatus 100)

Figure 2:
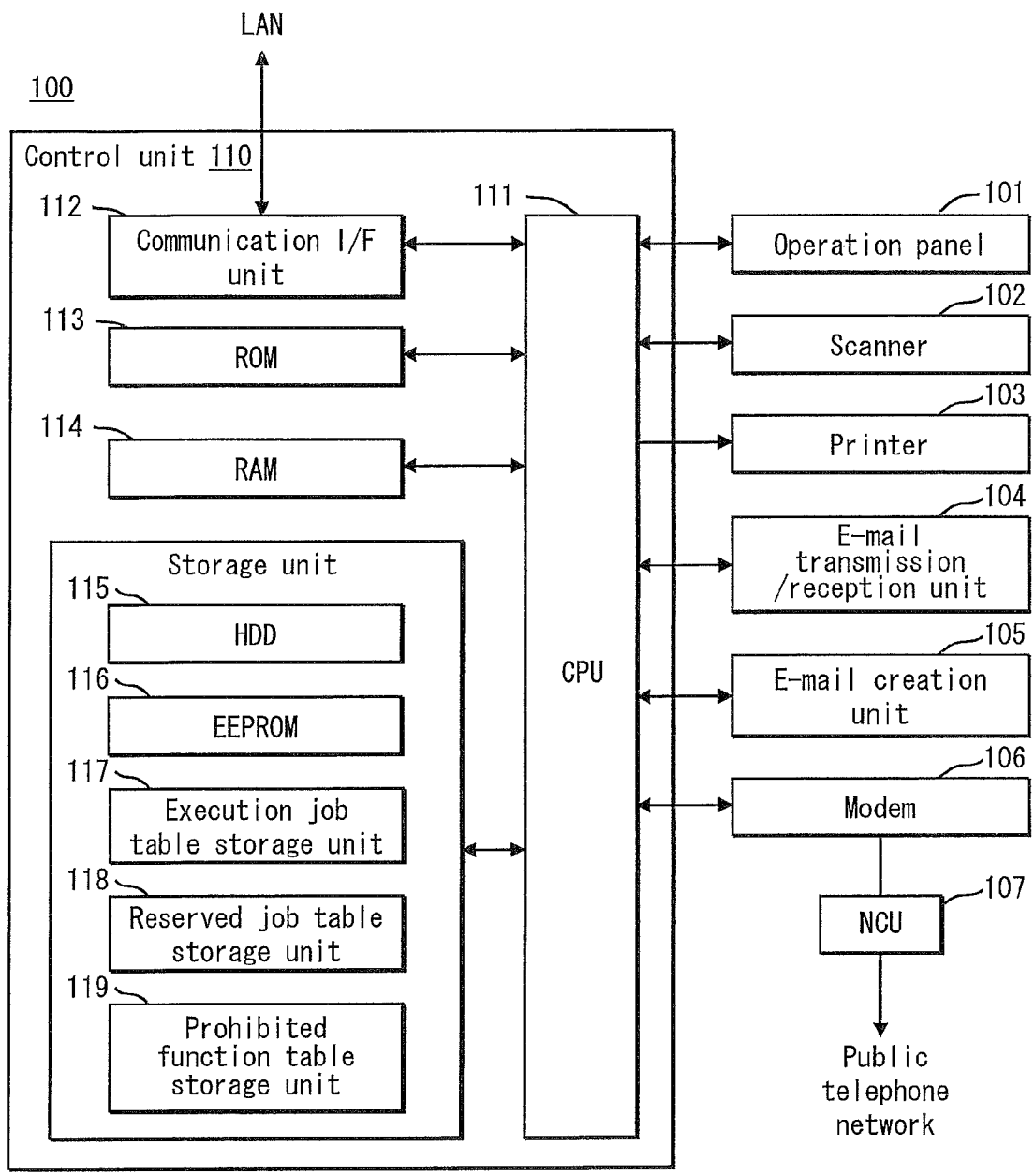
FIG. 2 is a control block diagram showing an image processing apparatus.

FIG. 2 is a schematic block diagram showing the structure of the image processing apparatus 100.

The image processing apparatus 100 includes, as shown in FIG. 2, an operation panel 101, a scanner unit 102, a printer unit 103, an e-mail transmission/reception unit 104, an e-mail creation unit 105, a modem 106, and the like, which are connected with the control unit 110.

The operation panel 101 provides a job input interface for a user, and displays a reception status of a job, a progress status of a job, an error message, and the like.

The scanner unit 102 scans an image on a document to convert light reflected from the document into an image signal, and reads the document to generate image data.

The printer unit 103 is, for example, an image formation apparatus compliant with a well-known electro photographic system. The printer unit 103 executes print jobs instructed by the client apparatuses 10, 20, ... , and converts image data read by the scanner unit 102 or FAX data received via the modem 106 described later into an image on a sheet.

The e-mail transmission/reception unit 104 transmits e-mail in the execution of the scan transmission job.

The e-mail creation unit 105 creates e-mail to be transmitted to an e-mail address designated by the user in the execution of the scan transmission job, by attaching an image data file of a document read by the scanner unit 102 to e-mail.

The modem 106 is connected via an NCU (Network Control Unit) 107 with a public telephone network for example, and transmits/receives FAX data between desired destinations.

The control unit 110 includes, as main components, a CPU (Central Processing Unit) 111, a communication interface (I/F) unit 112, a ROM (Read Only Memory) 113, and a RAM (Random Access Memory) 114. The control unit 110 further includes, as storage units, an HDD (Hard Disk Drive) 115, an EEPROM (Electrically Erasable and Programmable Read Only Memory) 116, an execution job table storage unit 117, a reserved job table storage unit 118, a prohibited function table storage unit 119, and the like.

The communication I/F unit 112 is an interface for connecting with the LAN, and is a LAN card or a LAN board for example.

The ROM 113 stores therein various programs for controlling operations executed by the image processing apparatus 100. The CPU 111 reads a necessary program from the ROM 113, and collectively controls operations of the scanner unit 102, the printer unit 103, and the like at proper timing to cause these units to smoothly execute the various jobs.

The RAM 114 is a main memory that functions as a work area used by the CPU 111 for performing computation or modification of data.

The HDD 115 stores there in data in a file format. Also, in the case where data stored in the RAM 114 exceeds the processing capacity of the RAM 114, the HDD 115 is used as a swap area.

The execution job table storage unit 117, the reserved job table storage unit 118, and the prohibited function table storage unit 119 respectively store therein an execution job table, a reserved job table, a prohibited function table, which are described later. Note that the functions of the execution job table storage unit 117 and the reserved job table storage unit 118 may instead be fulfilled by the EEPROM 116 or the HDD 115. The functions of the prohibited function table storage unit 119 may instead be fulfilled by the ROM 113 or the HDD 115.

Note that the structure of the image processing apparatus 100 described above is the same as those of other image processing apparatuses 200 ... .

(3. Structure of Maintenance Server 30)

Figure 3:
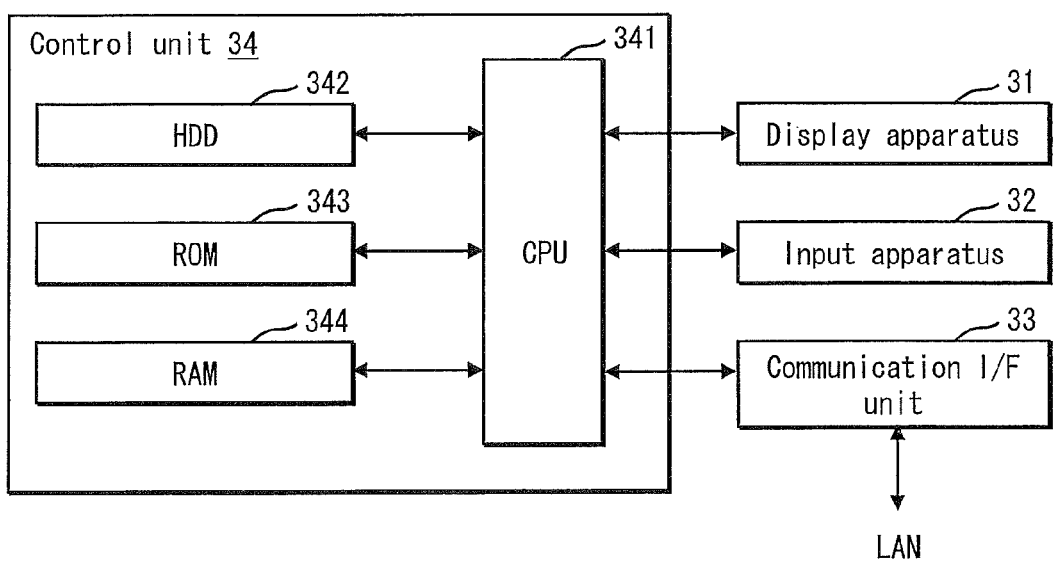
FIG. 3 is a control block diagram showing a maintenance server.

FIG. 3 is a control block diagram showing the schematic structure of the maintenance server 30. The maintenance server 30 includes, as shown in FIG. 3, a display apparatus 31, an input apparatus 32, a communication I/F unit 33, and the like, which are connected with the control unit 34.

The display apparatus 31 and the input apparatus 32 display thereon an address book to the user or provide the user with a data input interface, such that the user views a backup of the address book or makes modifications to the address book such as addition and deletion.

The communication I/F unit 33 transmits/receives backup data from/to the image processing apparatuses 100, 200, ... and the client apparatuses 10, 20, ... via a network such as a LAN.

The control unit 34 includes, as main components, a CPU 341, an HDD 342, a ROM 343, a RAM 344, and the like. The ROM 343 stores therein an application program necessary for performing maintenance of the image processing apparatus 100 and the like. The CPU 341 reads and boots the application program when necessary.

(4. Job Registration Processing)

Figure 4:
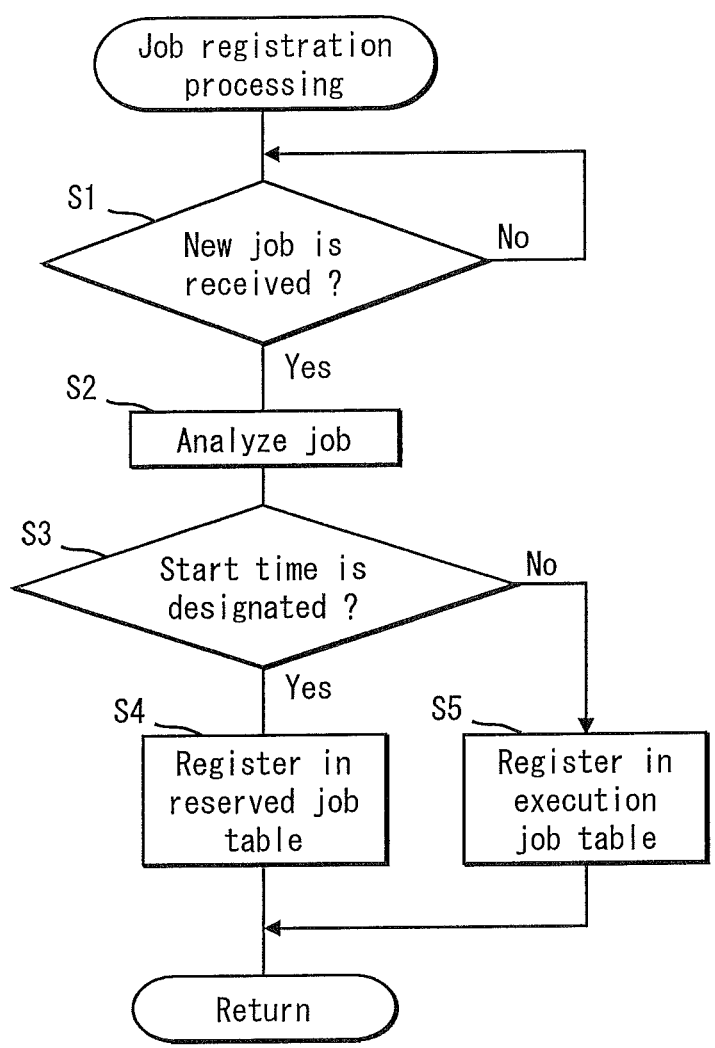
FIG. 4 is a flowchart of job registration processing.

FIG. 4 is a flow chart of job registration processing performed by the control unit 110 of the image processing apparatus 100.

Firstly, when receiving a new job (Step S1: YES), the control unit 110 analyzes the received new job (Step S2), and judges whether the job has a designated start time (Step S3). The control unit 110 performs such analysis processing of a job, by reading information on a header in which the details of the job is written or by acquiring information of the job through the job input via the operation panel of the image processing apparatus.

If the job has a designated start time (Step S3: YES), the control unit 110 registers the job in the reserved job table (Step S4), and returns to a main routine. The main routine here, indicates a routine of controlling the compositional elements of the image processing apparatus and operating the whole apparatus. A routine included in the job registration processing described here and a routine included in the job execution processing described later are each a subroutine of the main routine.

If the job does not have a designated start time (Step S3: NO), the control unit 110 registers the job in the execution job table (Step S5), and returns to the main routine.

FIG. 5 shows an example of the reserved job table. In the reserved job table, an image processing job such as a print job and a scan job is treated in the same way as a maintenance job such as a network setup job and an address book backup job, as shown in FIG. 5. These jobs are successively registered in the same table and collectively managed. Accordingly, it is possible to execute a maintenance job and then an image processing job in succession. Also, it is possible to execute an image processing job and then a maintenance job in succession. Moreover, in the reserved job table, it is possible to register information indicating job type, start time, and whether reboot is necessary as supplementary information, and furthermore a maintenance server as necessary. The reserved job table is composed of the information described above as shown in FIG. 5. Note that a numerical character is applied to a field for each job type for the convenience of identifying a job type. For example, the numerical character "1" indicates the print job, and the numerical character "2" indicates the scan job. The identification method is not necessarily limited to the method as shown in the figure using numerical characters. Alternatively, it may be possible to employ an identification method using alphabets or other codes. Further alternatively, it may be possible to employ an identification method without such codes.

FIG. 6 shows an example of the execution job table. The execution job table has the same structure as the reserved job table except that the execution job table does not include information of a start time. Image processing jobs are treated in the same way as maintenance jobs and these jobs are successively registered in the same table, like the reserved job table.

Note that maintenance jobs can be registered via the operation panel of the image processing apparatus or the client apparatus.

FIG. 7 shows an example of a maintenance job registration screen displayed on the operation panel of the image processing apparatus. A user registering a maintenance job can input information of the details of maintenance (type of maintenance job), start time, maintenance server on the operation panel. Regarding the start time, the user can select a button "Execute immediately" instead of designating a particular time.

Also, in FIG. 7, a name of a maintenance server registered in advance is selected from a pull-down menu. Alternatively, an IP address may be directly input.

FIG. 8 shows an example of a maintenance job registration screen of the client apparatus. The maintenance job registration screen shown in FIG. 8 is substantially the same as the maintenance job registration screen displayed on the operation panel of the image processing apparatus shown in FIG. 7. The maintenance job registration screen shown in FIG. 8 differs from that shown in FIG. 7 in that an image processing apparatus (MFP) to be maintained can be designated. In FIG. 8, an MFP to be maintained and a maintenance server are selected respectively among MFPs and maintenance servers registered in advance from a pull-down menu. Alternatively, an IP address may be directly input, in the same way as the maintenance job registration screen shown in FIG. 7.

(5. Job Execution Processing)

Figure 9:
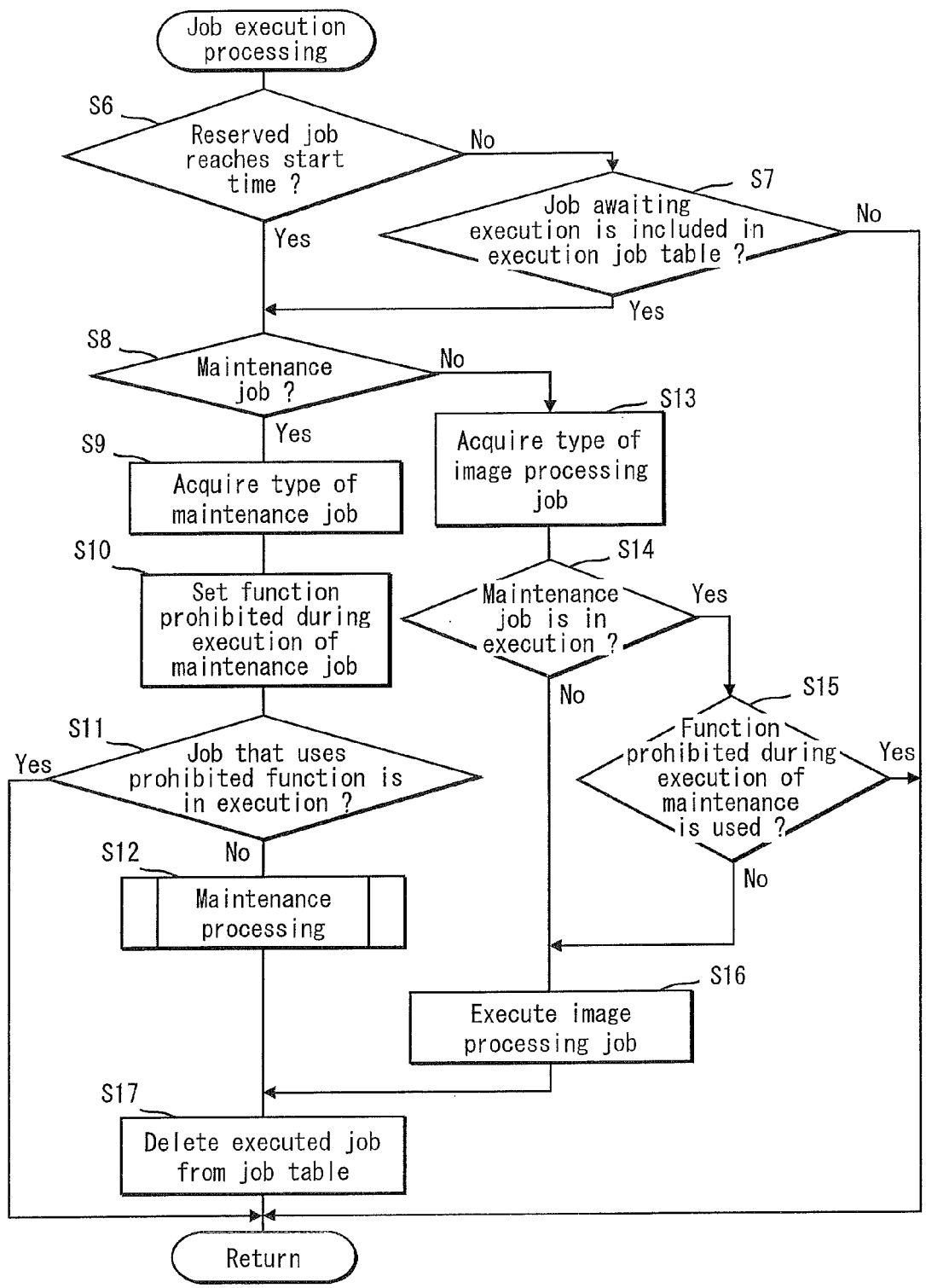
FIG. 9 is a flow chart of job execution processing.

FIG. 9 is a flow chart showing job execution processing.

Firstly, the control unit 110 checks the present time using a clock IC included in the CPU 111, and refers to the start time field of the reserved job table (FIG. 5) to judge whether any reserved job reaches its start time (Step S6).

If any reserved jog reaches its start time (Step S6: YES), the control unit 110 judges whether the reserved job is a maintenance job (Step S8). If a plurality of reserved jobs reach their start time, the control unit 110 prioritizes a job received earlier (a job having a lower job number).

If no reserved job reaches its start time (Step S6: NO), the control unit 110 then judges whether a job awaiting execution is included in the execution job table (see FIG. 6) (Step S7).

If a job awaiting execution is included in the execution job table (Step S7: YES), the control unit 110 further judges if the job is a maintenance job (Step S8). Here, if there are a plurality of jobs awaiting execution, the control unit 110 prioritizes a job received earlier (a job having a lower job number).

If no job awaiting execution is included in the execution job table (Step S7: NO), there is no job to be executed, and accordingly the control unit 110 returns to the main routine.

In the flow of the job execution processing, the control unit 110 checks whether there is a job to be executed by referring to the reserved job table, before referring to the execution job table. This means that a reserved job having a designated start time is executed in preference to a job having no designated start time. This enables execution of jobs with emphasis on the intention of the user that has reserved a job by designating a start time of the job.

If a job to be executed next is a maintenance job (Step S8: YES), the control unit 110 acquires a type of the maintenance job from a corresponding one of the reserved job table and the execution job table (Step S9), refers to a table shown in FIG. 10 described later to read a function of the image processing apparatus that cannot be used during execution of the maintenance job (hereinafter referred to as "prohibited function"), and sets the read prohibited function in the RAM 114 (Step S10).

Next, at this time, the control unit 110 judges whether a job that uses the prohibited function (an image processing job or a maintenance job) is currently in execution (Step S11). If a job that uses the prohibited function set in the RAM is not in execution, or if a job that does not use the prohibited function is in execution (Step S11: NO), the control unit 110 performs maintenance processing (Step S12), deletes the executed job from the job table (Step S17), and then returns to the main routine.

If another job that uses the prohibited function is in execution (Step S11: YES), the control unit 110 returns to the main routine, and then the routine backs to Step S11. If judging negatively in Step S11, the control unit 110 proceeds to the maintenance processing in Step S12.

If a job to be executed next is not a maintenance job (Step S8: NO), that is, if the job to be executed next is an image processing job, the control unit 110 acquires a type of the image processing job from a corresponding one of the reserved job table and the execution job table (Step S13).

Next, at this time, the control unit 110 judges whether the maintenance job is in execution (Step S14). If the maintenance job is not in execution (Step S14: NO), the control unit executes the image processing job (Step S16), deletes the executed job from the job table (Step S17), and then returns to the main routine.

If the maintenance job is in execution (Step S14: YES), the control unit 110 judges whether the image processing job that is to be executed uses the prohibited function that is prohibited during execution of the maintenance job (Step S15).

If the image processing job to be executed does not use the prohibited function (Step S15: NO), the control unit 110 executes the image processing job (Step S16), deletes the executed job from the job table (Step S17), and returns to the main routine.

If the image processing job to be executed uses the prohibited function (Step S15: YES), the control unit 110 returns to the main routine, and then goes through the same routine shown in FIG. 9 again, and the maintenance job completes. If judging negatively in Step S14, the control unit 110 executes the image processing job in Step S16, deletes the executed job from the job table (Step S17), and then returns to the main routine.

Note that if the control unit judges affirmatively in Step S15 and a job that does not use a prohibited function that is prohibited during execution of a maintenance job has a second or subsequent job number in the execution job table, the control unit 110 may prioritize the job and execute the job in parallel with the maintenance job in execution.

FIG. 10 shows an example of a table in which prohibited functions respectively corresponding to maintenance jobs are registered. This prohibited function table is stored in advance in the prohibited function table storage unit 119 (see FIG. 2). Alternatively, it may be possible to cause the user to register a prohibited function via the maintenance job registration screen shown in FIG. 7 or FIG. 8, in addition to prohibited functions set in advance.

Note that the network setup job shown in FIG. 10 is a maintenance job of setting an IP address, protocol, server address, server path, password, account, net BIOS (Basic Input/Output System), and the like. In the present embodiment, all the functions except the copy function are prohibited during execution of the network setup job.

Also, the address book backup job is a maintenance job of backing up a mail address and a FAX number input and stored in the image processing apparatus 100 to the maintenance server 30. The functions of registering in the address book, referring to the address book, and selecting a destination from the address book are prohibited during execution of the address book backup job.

Here, a BOX is a storage region designated by the user included in the HDD 115. Image data read by the scanner unit 102 is saved in the BOX. A BOX backup job is a kind of maintenance job of backing up the image data saved in the BOX to the maintenance server 30. When the image processing apparatus is equipped with the BOX, functions of saving a document in the BOX, transmitting from the BOX, and referring to the BOX are prohibited during execution of the BOX back up job.

During execution of a maintenance job relating to a mechanical part of a printer engine, functions of copying and printing are prohibited.

Moreover, during execution of maintenance job relating to a mechanical part of a scanner, functions that need reading of a document such as functions of scan transmission, FAX transmission, and copying are prohibited. However, functions of transmitting data attached to e-mail, which has already been scanned and stored in the BOX, and converting the data into FAX data for FAX transmission are not prohibited.

In the table shown in FIG. 10, a function prohibited from being executed in parallel with each maintenance job is registered. Alternatively, it may be employed to register a function permitted to be executed in parallel with each maintenance job, and perform the judgment in Step S11 or Step S15 regarding a function other than the permitted functions registered in the table as a prohibited function.

(6. Maintenance Processing)

Figure 11:
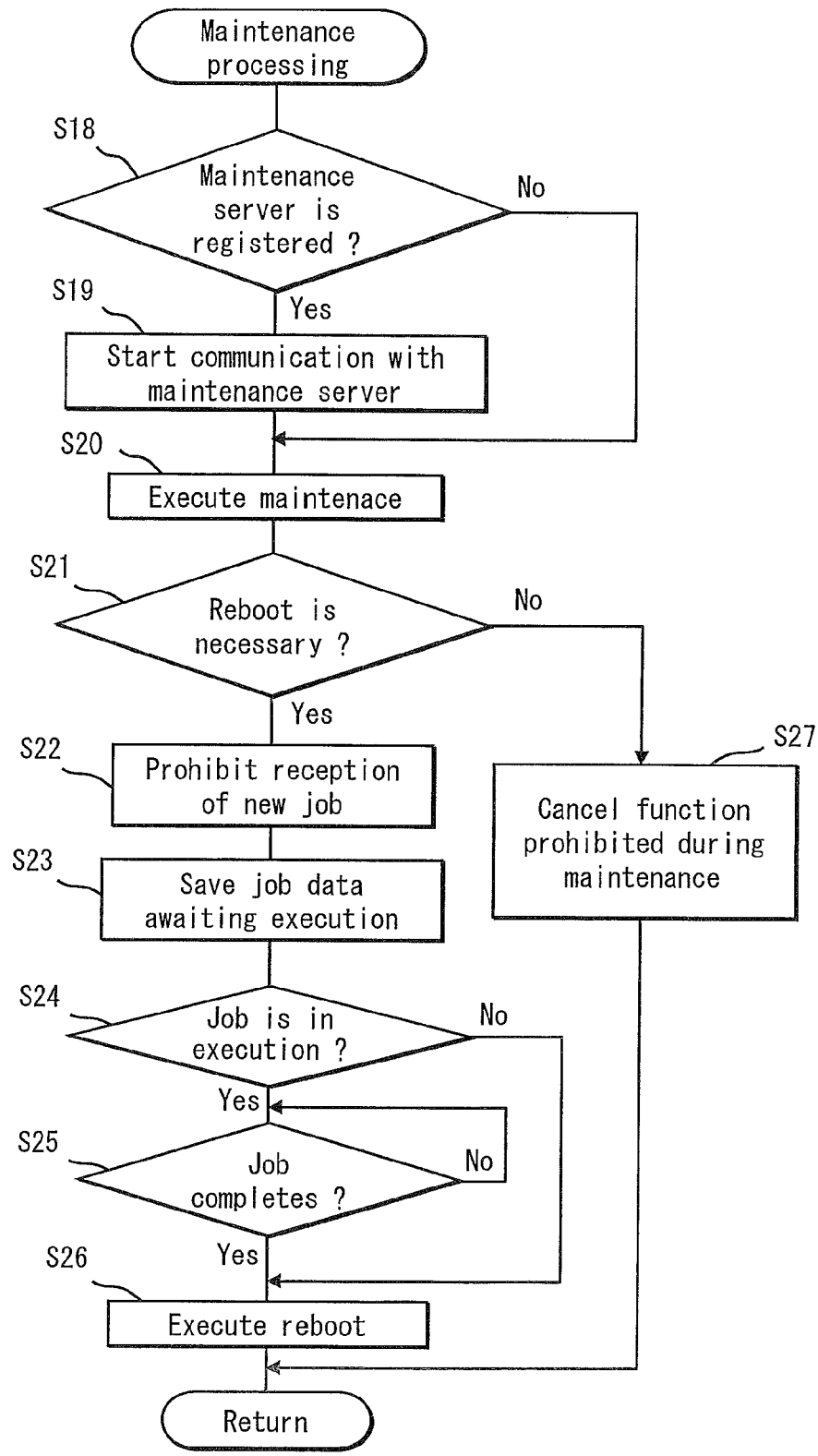
FIG. 11 is a flow chart of maintenance processing.

FIG. 11 is a flow chart showing the subroutine (Step S12) of the maintenance processing included in the job execution processing shown in FIG. 9. Firstly, the control unit 110 judges whether a maintenance server is registered (Step S18). If the maintenance server is registered (Step S18: YES), the control unit 110 starts communicating with the maintenance server (Step S19). Upon receiving an execution request from the image processing apparatus 100 via a known protocol, the maintenance server 30 boots a maintenance application to execute a maintenance job (Step S20). If the maintenance server is not registered (Step S18: NO), the control unit 110 executes the maintenance job in the image processing apparatus (Step S20).

Then, after executing the maintenance job, the control unit 110 judges whether reboot is necessary. If reboot is unnecessary (Step S21: NO), the control unit 110 cancels a prohibited function that is prohibited during execution of the maintenance job (Step S27), and returns to the main routine.

If reboot is necessary (Step S21: YES), the control unit 110 prohibits reception of a new job (Step S22), moves job data, which might be erased due to reboot, to the HDD 115 or the EEPROM 116 (FIG. 2) for temporary saving (Step S23). The job data is, for example, job data that is awaiting execution and has already been expanded on the RAM.

Then, if there is no job currently in execution (Step S24: NO), the control unit 110 performs reboot (Step S26), and returns to the main routine. If there is a job in execution (Step S24: YES), the control unit 110 judges whether the job completes (Step S25). If the job completes (Step S25: YES), the control unit 110 performs reboot (Step S26), and returns to the main routine. If the job does not complete (Step S25: NO), the control unit 110 repeats the judgment in Step S25 until the job completes. Then, if the job completes (Step S25: YES) the control unit 110 performs reboot (Step S26), and returns to the main routine.

Note that after reboot is performed, the image processing apparatus is reset, and the prohibited function set in Step S10 included in the flow of the job execution processing (FIG. 9) is cancelled.

A maintenance job that needs the above reboot is for example a job of executing a protocol of automatically setting an IP address for setting the network. A maintenance job that does not need reboot is for example a job of backing up an address book or data stored in the image processing apparatus.

Figure 12:
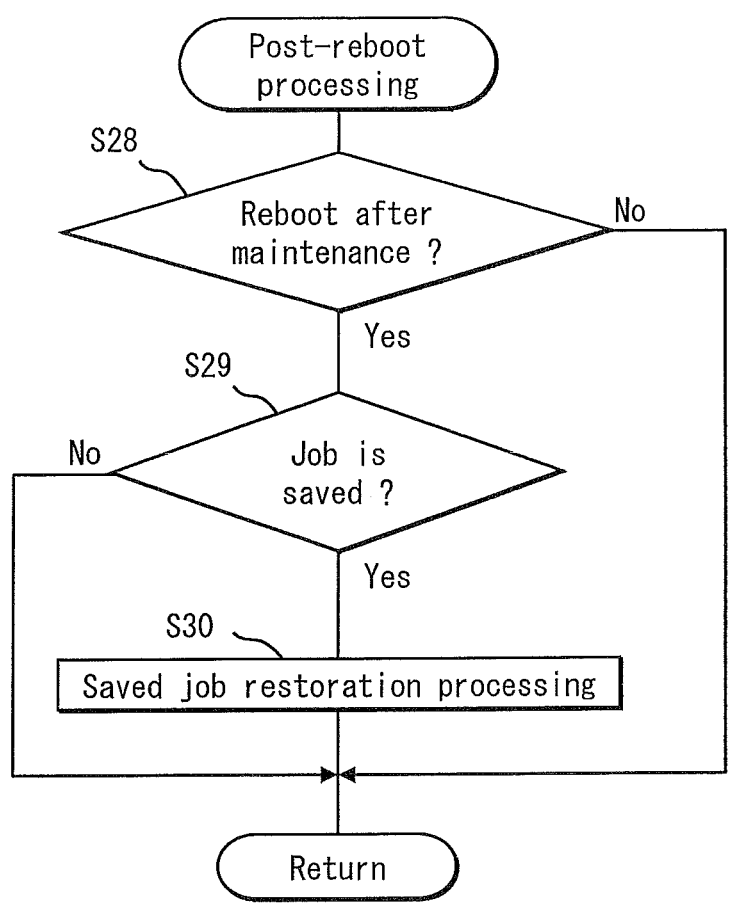
FIG. 12 is a flow chart of post-reboot processing.

FIG. 12 is a flowchart showing post-reboot processing. After reboot is performed, the control unit 110 judges whether the reboot is performed after a maintenance job (Step S28). If the reboot is performed after the maintenance job (Step S28: YES), the control unit 110 judges whether any job has been saved (see Step S23 in FIG. 11) (Step S29).

If any job has been saved (Step S29: YES), the control unit 110 restores the saved job (Step S30), and returns to the main routine.

If no job has been saved (Step S29: NO), the control unit 110 returns to the main routine without performing processing.

Also if reboot is not performed after the maintenance job (Step S28: NO), the control unit 110 returns to the main routine without performing processing.

Note that the judgment on whether reboot is performed after the maintenance job in Step S28 can be performed in the following manner.

In the flow of the maintenance processing shown in FIG. 11, at any one time from when reboot is judged to be necessary (Step S21) to when there boot is performed (Step S26), the control unit 110 sets a flag in a nonvolatile memory such as an EEPROM indicating that the reboot is for executing a maintenance job, and refers to the flag in Step S28 shown in FIG. 12 to judge whether reboot is performed after the maintenance job.

Furthermore, the following method may be employed for performing the judgment in Step S29 on whether any job has been saved.

In the flow of the maintenance processing shown in FIG. 11, the control unit 110 saves job data awaiting execution in Step S23, and sets a flag in a nonvolatile memory such as an EEPROM, which indicates that there is a saved job. Then, the control unit 110 stores a memory address of a saving destination relating to the saved job data together with the saved job data, and refers to the flag in Step S29 shown in FIG. 12. If there is a saved job, the control unit 110 performs saved job restoration processing in Step S30 based on the saved job and the memory address of the saving destination.

Figure 13:
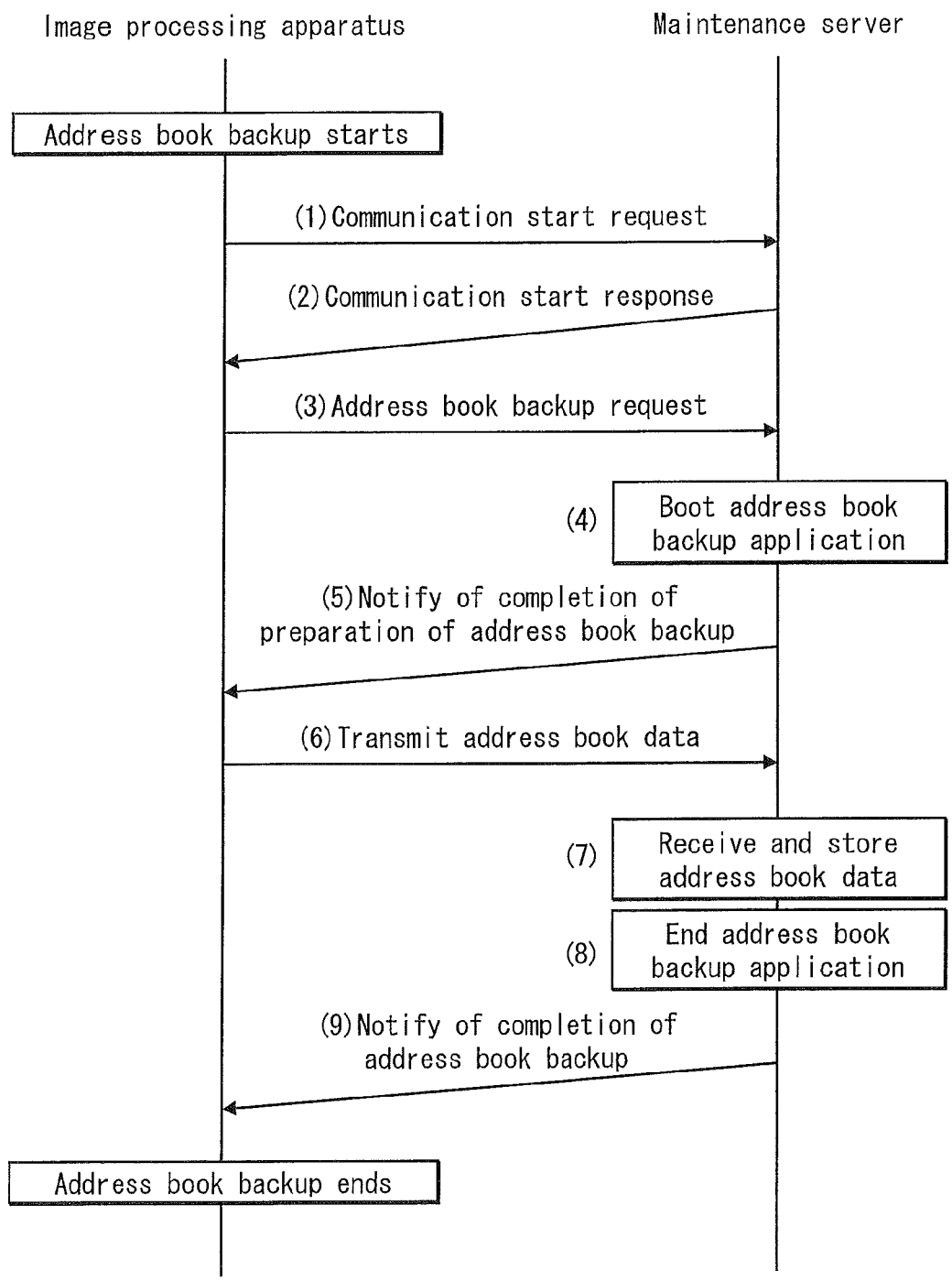
FIG. 13 shows a sequence diagram showing backup of an address book.

FIG. 13 is a communication sequence diagram showing the outline of backup of an address book, as one of embodiments of the maintenance job.

(1) When the image processing apparatus 100 receives an address book backup job that is to be immediately executed, or at a start time of an address book backup job registered in the reserved job table, the image processing apparatus 100 transmits a communication start request to the maintenance server 30.

(2) Upon receiving the communication start request, the maintenance server 30 transmits a communication start response to the image processing apparatus 100. Then, communication for backup processing is established.

(3) Then, the image processing apparatus 100 transmits a backup request of an address book to the maintenance server 30.

(4) Upon receiving the backup request, the maintenance server 30 boots an address book backup application.

In this way, a desired application is booted only when requested. This is because if the application is always booted, an unnecessary load is imposed on a CPU of the maintenance server 30 and this reduces the processing speed of executing other applications.

(5) When boot of the address book backup application completes and preparation for backup completes, the maintenance server 30 notifies the image processing apparatus 100 of completion of preparation for the backup.

(6) Then, the image processing apparatus 100 transmits data of the address book to the maintenance server 30.

(7) The maintenance server 30 receives the transmitted data of the address book, and stores therein the data. This completes the backup.

(8) The address book backup application ends.

(9) The maintenance server 30 notifies the image processing apparatus 100 of completion of the address book backup.

The communication for performing address book backup processing ends, and a series of the address book backup processing completes.

Note that if the maintenance server 30 is a dedicated server for particular maintenance (backup of an address book in the above example), an application (address book backup application) for the dedicated server may be always booted. In such a case, the procedures (3)-(5) shown in FIG. 13 are unnecessary.

The present invention is not limited to the aspect of an apparatus invention relating to the above image processing system and image processing apparatus. Alternatively, the present invention may be realized in an aspect of a method invention as an efficient job execution method.

Also, in the case where the present invention is realized as a computer program or a recording medium having recorded thereon the computer program, it may be the entire program that controls the whole image processing apparatus, the whole system, or only parts that fulfill the functions of the present invention. As the recording medium, it may be possible to employ a flexible disc, a CD-ROM, a DVD-ROM, a magneto optical disc, an IC card, a ROM cartridge, a punched card, a printed material on which a code such as a barcode is printed, an internal storage apparatus of a computer such as a RAM, a ROM, and an HDD, and various types of computer readable media such as external storage apparatus.

According to the above embodiment, maintenance jobs and image processing jobs are collectively registered in the reserved job table and the execution job table. Control can be performed such that registered jobs are executed in succession based on the tables. Accordingly, as soon as execution of a maintenance job completes, a next image processing job can be executed. As a result, the image processing job does not need to unnecessarily wait to be executed. Furthermore, when an image processing job and a maintenance job are executable in parallel with each other, the control unit 110 executes the image processing job and the maintenance job in parallel. This can accelerate execution of the image processing job.

MODIFICATION EXAMPLES

Note that although the present invention has been described based on the embodiment, the present invention is not limited to the above embodiment, and may include the following modification examples.

(1) According to the above embodiment, in the flow chart of the job execution processing shown in FIG. 9, a prohibited function is listed for each maintenance job, and execution of a job that uses the prohibited function is prohibited during execution of the maintenance job. Conversely, for each image processing job, by listing a maintenance job prohibited from being executed or a maintenance job permitted to be executed, it is possible to perform control in the same way as in the embodiment.

In other words, if the job table includes a maintenance job and an image processing job that are executable in parallel with each other, it is only enough to perform control such that these jobs are executed in parallel with each other. This can reduce downtime of the image processing job as much as possible.

(2) According to the above embodiment, the mail server 5 is connected with the image processing apparatuses 100, 200, ... and the client apparatuses 10, 20, ... via the LAN 4. Alternatively, the mail server 5 may be connected with these apparatuses via a network such as a WAN (Wide Area Network) and the Internet.

(3) In the above embodiment, any one of the client apparatuses 10, 20, ... may function as the maintenance server 30. Alternatively, a plurality of client apparatuses may share the functions of a maintenance server.

(4) According to the above embodiment, the present invention is realized as an image processing system. Alternatively, it is possible to realize the present invention as a single image processing apparatus. That is, the maintenance server 30 and the like on the network are unnecessary for performing maintenance of mechanical parts, and it is possible to execute such a maintenance job in an image processing apparatus alone. In this case, since image processing jobs like a copy job, a filing job, and the like are executed solely by the image processing apparatus 100, execution of these image processing jobs and the maintenance jobs of mechanical parts is controlled in the same way, in the single image processing apparatus.

(5) The image processing apparatus relating to the present invention is not limited to an MFP as described above. It may be possible to employ an apparatus capable of performing only one function (for example, printer) in the case where a plurality of maintenance jobs of the apparatus includes a maintenance job that is executable in parallel with a print job.

The present invention may be any appropriate combination of the above embodiment and modifications.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. An image processing apparatus capable of executing at least one of a plurality of image processing jobs including a copy job, a FAX job, a print job, and a scan job, the image processing apparatus comprising:
    a first receiver operable to receive one or more of the plurality of image processing jobs;
    a second receiver operable to receive one or more maintenance jobs necessary for maintaining the image processing apparatus;
    a job register operable to register therein the received image processing jobs and the received maintenance jobs; and
    a controller operable to control execution of the registered image processing jobs and the registered maintenance jobs, with reference to the job register,
    wherein when the controller judges a next job registered in the job register is an image processing job, the controller prevents the execution of the judged next job when the judged next job requires prohibited functions corresponding to an executing maintenance job,
    wherein when the judged next job is a maintenance job, the controller stores prohibited functions corresponding to the judged next job and prevents the subsequent execution of jobs that require the prohibited functions, and
    wherein if a maintenance job and an image processing job that are executable in parallel with each other are registered in the job register, the controller executes the maintenance job and the image processing job in parallel with each other.

2. The image processing apparatus of claim 1, further comprising
    a storage operable to store therein a table having registered therein, for each of the received maintenance jobs, one or more image processing jobs executable or in executable in parallel with the maintenance job,
    wherein the controller judges whether each of the registered image processing jobs is executable in parallel with each of the registered maintenance jobs, with reference to the table.

3. The image processing apparatus of claim 1, wherein
    the first receiver includes a first start time receiver operable to receive designation of a start time of each of the received image processing jobs,
    the second receiver includes a second start time receiver operable to receive designation of a start time of each of the received maintenance jobs,
    if the designation of the start time of the image processing job and the start time of the maintenance job are received, the job register registers therein the received image processing job and the start time thereof in association with each other, and the received maintenance job and the start time thereof in association with each other, and
    the controller executes a maintenance job or an image processing job that reaches a start time thereof in preference to a maintenance job or an image processing job having no designated start time.

4. The image processing apparatus of claim 1, wherein
    if reboot of the image processing apparatus needs to be performed after the maintenance job completes,
    before the reboot is performed, the controller saves data relating to the registered maintenance jobs and the registered image processing jobs into an internal or external nonvolatile storage, and
    after the reboot is performed, the controller restores the saved data and controls execution of a job to be executed next.

5. The image processing apparatus of claim 1, wherein
    the second receiver includes a server designation receiver operable to receive designation of a maintenance server for executing each of the received maintenance jobs,
    the designated maintenance server is connected with the image processing apparatus via a network, and
    the job register registers therein the maintenance job and the designated maintenance server in association with each other.

6. The image processing apparatus of claim 5, further comprising
    a transmitter operable to transmit an execution request for executing the maintenance job to the maintenance server registered in association with the maintenance job.

7. The image processing apparatus of claim 1, wherein when the judged next job is a maintenance job, the controller stores prohibited functions corresponding to the judged next job,
    wherein the controller determines the prohibited functions corresponding to the judged next job by retrieving the prohibited functions from prohibited function storage or by retrieving the prohibited functions entered when creating the judged next job.

8. A maintenance system for maintaining image processing apparatuses, the maintenance system including the image processing apparatuses and maintenance servers for executing maintenance jobs, the image processing apparatuses and the maintenance servers being connected with one another via a network, wherein each of the image processing apparatuses comprises:
    a first receiver operable to receive one or more image processing jobs;
    a second receiver operable to receive one or more maintenance jobs necessary for maintaining the image processing apparatus in association with designation of maintenance servers for respectively executing the maintenance jobs;

a job register operable to register therein the received image processing jobs and the received maintenance jobs associated with the maintenance servers;

a controller operable to control execution of the registered image processing jobs and the registered maintenance jobs, with reference to the job register, wherein when the controller judges a next job registered in the job register is an image processing job, the controller prevents the execution of the judged next job when the judged next job requires prohibited functions corresponding to an executing maintenance job, wherein when the judged next job is a maintenance job, the controller stores prohibited functions corresponding to the judged next job and prevents the subsequent execution of jobs that require the prohibited functions;

wherein if a maintenance job and an image processing job that are executable in parallel with each other are registered in the job register, the controller executes the maintenance job and the image processing job in parallel with each other;

an execution request transmitter operable to transmit an execution request for executing each of the maintenance jobs to one of the maintenance servers registered in association with the maintenance job, and each of the maintenance servers comprises:

an execution request receiver operable to receive the execution request from the image processing apparatus; and a maintenance job executer operable, when the execution request is received, to boot an application for executing the maintenance job and execute the maintenance job.

9. The maintenance system of claim 8, wherein instead of or in addition to the second receiver, a maintenance job reception apparatus is connected to the network, the maintenance job reception apparatus comprises:

a maintenance designation receiver operable to receive a maintenance job to be executed, designation of one of the image processing apparatuses on which the maintenance job is to be executed, and designation of one of the maintenance servers for executing the maintenance job; and a notifier operable to notify the designated image processing apparatus of a type of the designated maintenance job and maintenance information relating to the designated maintenance server, as maintenance information, the image processing apparatus comprises a maintenance information receiver operable to receive the notification of the maintenance information, and the job register registers therein the designated maintenance job and the designated maintenance server in association with each other.

10. The maintenance system of claim 9, wherein the maintenance designation receiver includes a start time receiver operable to receive designation of a start time of the received maintenance job, and the job register registers therein the maintenance job and the designated start time in association with each other.

11. The maintenance system of claim 8, wherein when the judged next job is a maintenance job, the controller stores prohibited functions corresponding to the judged next job, wherein the controller determines the prohibited functions corresponding to the judged next job by retrieving the prohibited functions from prohibited function storage or by retrieving the prohibited functions entered when creating the judged next job.

12. A job control method executed in an image processing apparatus capable of executing at least one of a plurality of image processing jobs including a copy job, a FAX job, a print job, and a scan job, the job control method comprising:

a first reception step of receiving one or more of the plurality of image processing jobs;

a second reception step of receiving one or more maintenance jobs necessary for maintaining the image processing apparatus;

a job registration step of registering in a job register the received image processing jobs and the received maintenance jobs;

a control step of controlling execution of the registered image processing jobs and the registered maintenance jobs, with reference to the registration in the job registration step, wherein when the control step judges a next job registered in the job register is an image processing job, the execution of the judged next job is prevented when the judged next job requires prohibited functions corresponding to an executing maintenance job, wherein when the judged next job is a maintenance job, prohibited functions corresponding to the judged next job are stored and the subsequent execution of jobs that require the prohibited functions is prevented, and wherein if a maintenance job and an image processing job that are executable in parallel with each other are registered in the job register, the control step executes the maintenance job and the image processing job in parallel with each other.

13. The job control method of claim 12, further comprising a storage step of storing a table having registered therein, for each of the received maintenance jobs, one or more image processing jobs executable or in executable in parallel with the maintenance job, wherein the control step judges whether each of the registered image processing jobs is executable in parallel with each of the registered maintenance jobs, with reference to the table.

14. The job control method of claim 12, wherein the first reception step includes a first start time reception substep of receiving designation of a start time of each of the received image processing jobs, the second reception step includes a second start time reception substep of receiving designation of a start time of each of the received maintenance jobs, if the designation of the start time of the image processing job and the start time of the maintenance job are received, the job registration step registers the received image processing job and the start time thereof in association with each other, and the received maintenance job and the start time thereof in association with each other, and the control step executes a maintenance job or an image processing job that reaches a start time thereof in preference to a maintenance job or an image processing job having no designated start time.

15. The job control method of claim 12, wherein if reboot of the image processing apparatus needs to be performed after the maintenance job completes, before the reboot is performed, the control step saves data relating to the registered maintenance jobs and the registered image processing jobs into an internal or external nonvolatile storage, and after the reboot is performed, the control step restores the saved data and controls execution of a job to be executed next.

16. The job control method of claim 12, wherein
the second reception step includes a server designation reception substep of receiving designation of a maintenance server for executing each of the received maintenance jobs,
the designated maintenance server is connected with the image processing apparatus via a network, and
the job registration step registers the maintenance job and the designated maintenance server in association with each other.

17. The job control method of claim 16, further comprising
a transmission step of transmitting an execution request for executing the maintenance job to the maintenance server registered in association with the maintenance job.

18. The job control method of claim 12, wherein when the judged next job is a maintenance job, prohibited functions corresponding to the judged next job are stored,
wherein the prohibited functions corresponding to the judged next job are determined by retrieving the prohibited functions from prohibited function storage or by retrieving the prohibited functions entered when creating the judged next job.

* * * * *